United States Patent [19]

Misunas et al.

[11] 4,149,240

[45] Apr. 10, 1979

[54] DATA PROCESSING APPARATUS FOR HIGHLY PARALLEL EXECUTION OF DATA STRUCTURE OPERATIONS

[75] Inventors: David P. Misunas, Brighton; Jack B. Dennis, Belmont, both of Mass.

[73] Assignee: Massachusetts Institute of Technology, Cambridge, Mass.

[21] Appl. No.: 695,721

[22] Filed: Jun. 14, 1976

Related U.S. Application Data

[63] Continuation-in-part of Ser. No. 605,932, Aug. 19, 1975, which is a continuation-in-part of Ser. No. 456,488, Mar. 29, 1974, Pat. No. 3,962,706.

[51] Int. Cl.² ............... G06F 3/00; G06F 13/00; G06K 17/00
[52] U.S. Cl. ............................ 364/200; 179/15 BA
[58] Field of Search .......................... 364/200, 900; 179/15 AL, 15 AT, 15 BA, 15 BV, 18 ES

[56] References Cited

U.S. PATENT DOCUMENTS

| | | | |
|---|---|---|---|
| 3,343,135 | 9/1967 | Freiman et al. | 364/200 |
| 3,349,375 | 10/1967 | Seeber et al. | 364/200 |
| 3,537,074 | 10/1970 | Stokes et al. | 364/200 |
| 3,657,736 | 4/1972 | Boom et al. | 364/200 |
| 3,676,852 | 7/1972 | Abernathy et al. | 364/200 |
| 3,718,912 | 2/1973 | Hasbrouck et al. | 364/200 |
| 3,732,548 | 5/1973 | Howells et al. | 364/200 |
| 3,749,845 | 7/1973 | Fraser | 364/200 |
| 3,766,532 | 10/1973 | Liebel | 364/200 |
| 3,810,100 | 5/1974 | Hungerford et al. | 364/200 |
| 3,878,514 | 4/1975 | Faber | 364/200 |
| 4,032,899 | 6/1977 | Jenny et al. | 364/200 |
| 4,058,672 | 11/1977 | Crager et al. | 178/3 |
| 4,071,706 | 1/1978 | Warren | 179/15 AL |
| 4,074,232 | 2/1978 | Otomo et al. | 179/15 BA |

*Primary Examiner*—Gareth D. Shaw
*Assistant Examiner*—Jan E. Rhoads
*Attorney, Agent, or Firm*—Arthur A. Smith, Jr.; Gerald Altman

[57] ABSTRACT

A digital computer may be structured in two separate sections, one of which performs the execution of arithmetic and conditional instructions, and the other which contains and performs operations upon data structures. The organization of the structure processing section of a digital computer is described herein. The structure processing section maintains data structures represented as acyclic directed graphs and is viewed as a functional unit by the instruction processing section; that is, instructions specifying structure operations are sent to the section, and any resulting values are returned to the instruction processing section. The organization of the structure processing section permits the simultaneous processing of many structure operations.

20 Claims, 8 Drawing Figures

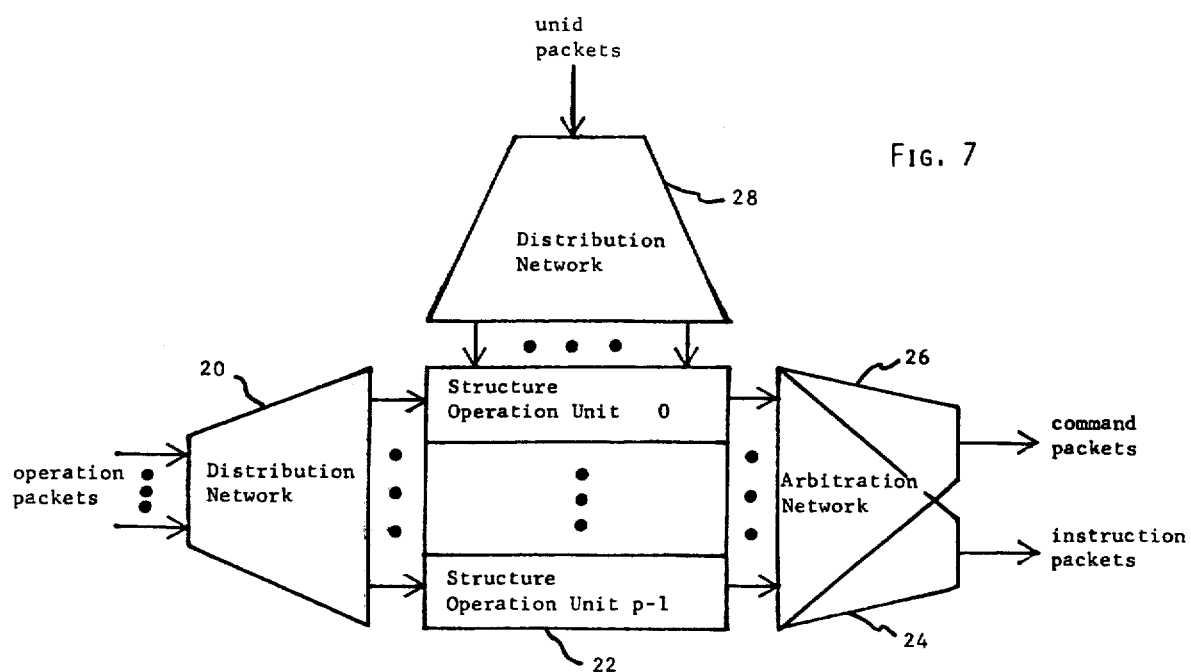

DATA PROCESSING APPARATUS FOR HIGHLY PARALLEL EXECUTION OF DATA STRUCTURE OPERATIONS

The Government has rights to this invention pursuant to Grant No. NSF-76-58-GI-34761 and Institutional Patent Agreement No. 0100 awarded by the National Science Foundation.

RELATED APPLICATIONS

The present application is a continuation-in-part of application Ser. No. 605,932, filed Aug. 19, 1975, in the names of the applicants herein for Data Processing Apparatus For Highly Parallel Execution of Stored Programs, which is a continuation-in-part of application Ser. No. 456,488, Mar. 29, 1974, now U.S. Pat. No. 3,962,706, issued June 8, 1976, in the names of the applicants herein for Data Processing Apparatus For Highly Parallel Execution of Stored Programs.

BACKGROUND

Study of the expression of concurrent operation within programming languages has yielded a data-driven form of program representation known as data flow. The development of the data-flow form of representation was accompanied by the development of a processor designed to exploit the parallelism exposed by the data-flow form in the execution of arithmetic and conditional program constructs. The architectures of two such processors are described in related applications Ser. No. 456,488, now U.S. Pat. No. 3,962,706, and Ser. No. 605,932 which are incorporated into the present specification by reference.

SUMMARY

The Elementary Processor presented in application Ser. No. 456,488, now U.S. Pat. No. 3,962,706, was designed to execute a simple class of programs which are well-suited for the representation of certain signal processing computations. This class of programs permits only elementary computations; no decision capability is provided. The Basic Processor presented in application Ser. No. 605,932 adds conditional and iterative constructs to the language and architecture and incorporates a multi-level memory system in which the active memory is operated as a cache, and individual instructions are retrieved from the auxiliary memory as they are required for computation. It is desired to expand the capabilities of The Elementary and Basic Processors to permit the use of data structures in the computations executed by the processors. The present disclosure describes the modification of the data-flow language to incorporate data structures and the organization of a structure processing section of a data-flow processor. The instruction processing section of a data-flow processor is of the form described for The Elementary or The Basic Processors. Any instructions encountered in the course of program execution which perform data structure operations are transmitted to the structure processing section which stores data structures and performs operations upon the data structures in response to commands received from the instruction processing section.

Generally, the illustrated embodiment features a structure memory for holding at least a record of active data structure nodes, at least a structure operation unit for managing signals in correspondence with the execution of data structure operations, at least an identity unit for managing signals in correspondence with identity operations, at least a status unit for managing signals in correspondence with the status of the structure memory, a distribution network for transmitting signals representing information packets from the structure operation unit and the identity unit to the structure memory, a first arbitration network for transmitting signals representing information packets from the structure memory to the instruction processing section, a second arbitration network for transmitting signals representing information packets from the structure memory to the status unit, and a third arbitration network for transmitting signals representing information packets from the structure memory to the identity unit.

The invention accordingly comprises the system of the present disclosure, its components and their interrelationships, the scope of which will be indicated in the appended claims.

BRIEF DESCRIPTION OF THE DRAWINGS

For a fuller understanding of the nature and objects of the present invention, reference is to be made to the following description, which is to be taken in connection with the accompanying drawings, wherein:

FIG. 6 illustrates the format of the structure cells of the present invention when containing the data structure of FIG. 2;

FIG. 7 is a general schematic of a structure operation unit, a component of the system of FIG. 1;

DETAILED DESCRIPTION

Overview of the Preferred Embodiment

Figure 1:
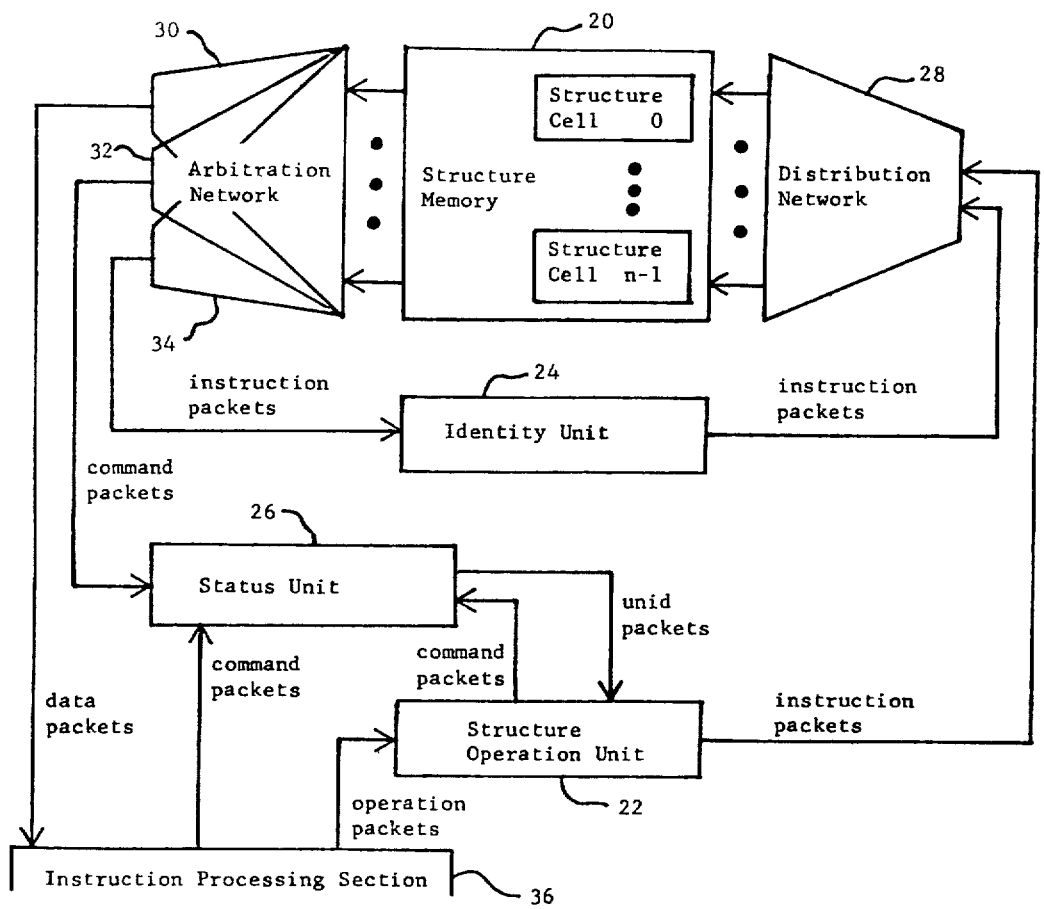
FIG. 1 is a general schematic of a system embodying the present invention.

Generally, the embodiment of FIG. 1 comprises a structure memory 20 for holding at least a record of active structure nodes, a structure operation unit 22 for managing signals in correspondence with the execution of data structure operations, an identity unit 24 for managing signals in correspondence with identity operations, a status unit 26 for managing signals in correspondence with the status of the structure memory 20, a distribution network 28 for transmitting signals representing information packets from the structure operation unit 22 and from the identity unit 24 to the structure memory 20, a first arbitration network 30 for transmitting signals representing information packets from the structure memory 20 to the instruction processing section 36, a second arbitration network 32 for transmitting signals representing information packets from the structure memory 20 to the status unit 26, and a third arbitration network 34 for transmitting signals representing information packets from the structure memory 20 to the identity unit 24 Structural details of structure memory 20 are shown in the accompanying drawings and are described below and are related to details of the memory of aforementioned U.S. Pat. No. 3,962,706, in FIGS. 3, 4 31a, 32, and 33 and at column 4, lines 12 through 47 and at column 12, line 24 to column 14, line 29. Structural details of structure operation unit 22, identity unit 24, and status unit 26 are shown in the accompanying drawings and are described below and are similar to details of the Functional Units of aforementioned U.S. Pat. No. 3,962,706, in FIGS. 6 and 34 and at column 5, lines 1 through 12 and at column 14, lines 30 through 45. Structural details of distribution network 28 are shown in the accompanying drawings and are described below and are substantially the same as details of the distribution network of aforementioned U.S. Pat. No. 3,962,706, in FIGS. 39, 40, 41, and 42 and at column 16, line 13 to column 17, line 17. Structural details of first arbitration network 30, second arbitration network 32, and third arbitration network 34 are shown in the accompanying drawings and are described below and are substantially the same as details of the arbitration network of aforementioned U.S. Pat. No. 3,962,706, in FIGS. 35, 36, 37, and 38 at column 14, line 46 to column 16, line 12.

Details of the components of the foregoing system are described below following a discussion of background considerations in reference to the representation of instructions within the data-flow language.

The Data-Flow Language

A program expressed in the data-flow language is constructed of two kinds of elements, called actors and links. An actor has a number of input arcs which supply values necessary for its execution and one output arc upon which results are placed. A small dot represents a link which has one input arc upon which it receives results from an operator and a number of output arcs over which it distributes copies of the result to other actors.

Values are conveyed over the arcs of a program by tokens, represented as large solid dots. An actor with a token on each of its input arcs, and no token on its output arc, is enabled and sometime later will fire, removing the tokens from its input arcs, computing a result using the values carried by the input tokens, and associating the result with a token placed on its output arc. In a similar manner, a link is enabled when a token is present on its input arc, and no token is present on any of its output arcs. It fires by removing the token from its input arc and associating copies of the value carried by the input token with tokens placed on its output arcs.

A value conveyed by a token is either an elementary value or a structure value. An elementary value is a single integer, real, string, or Boolean value. A structure value in a data-flow program is composed of a number of elementary values and is represented as an acyclic directed graph having one root node with the property that each node of the graph can be reached by a directed path from the root node. A node of the graph is either a structure node or an elementary node. A structure node serves as the root node for a substructure of the structure and represents a value which is a set of selector-value pairs $$\{(S1, V1), \ldots, (Sn, Vn)\}$$

where
$Si \in \{integers\} \cup \{strings\}$
$Vi \in \{elementary\ values\} \cup \{structure\ values\} \cup \{nil\}$ and Si is the selector of node Vi. An elementary node has no emanating arcs; rather, an elementary value is associated with the node. A node with no emanating arcs and no associated elementary value has value nil.

To illustrate operation of the structure processing section of the processor, in the present disclosure we shall consider structures represented as binary trees. A selector of such a structure can have one of two values, L (left) or R (right), designating the left and right branches of the tree, respectively.

Figure 2:
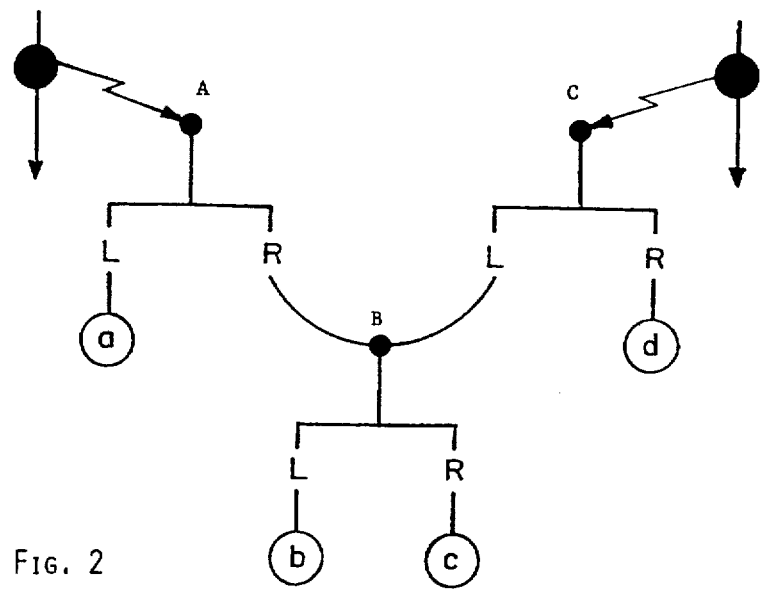
FIG. 2 is a diagram of a data structure, illustrating certain aspects of the present invention.

A structure value is represented by a data token carrying a pointer to the root node of the structure. In FIG. 2 the structure A contains three elementary values a, b, and c, designated by the simple selector L and the compound selectors R.L and R.R respectively. Structure node B of structure A is shared with structure C and is designated by a different selector in C than in A.

Figure 3:
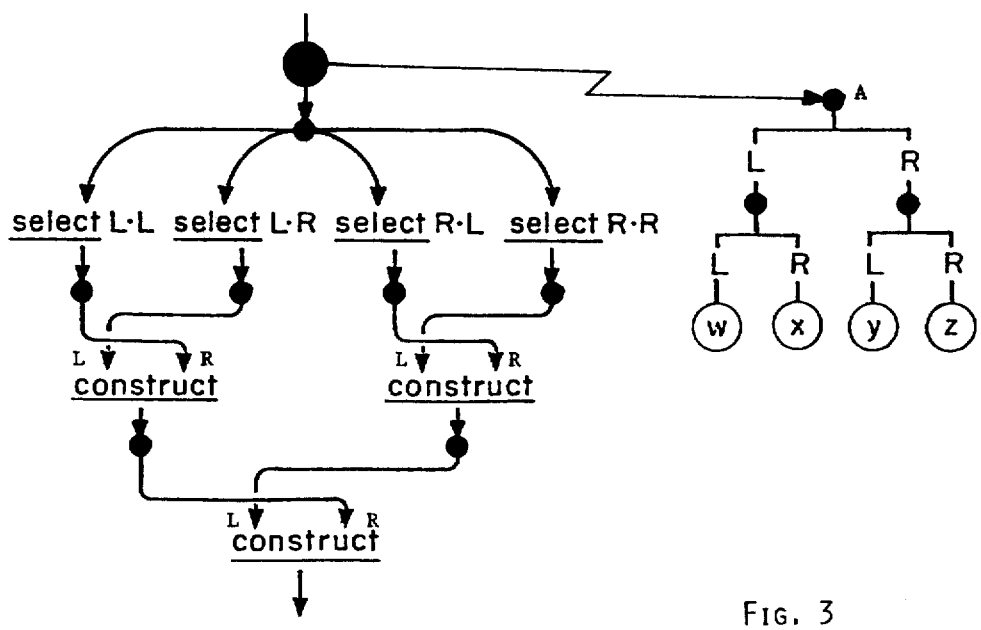
FIG. 3 is a diagram of a data-flow program, illustrating the operation of two actors which perform data structure operations.

The data-flow program of FIG. 3 transposes the elements of the four-element structure presented on its input. Initially, the input link of the program is enabled and, upon firing, creates four copies of the token conveying a pointer to structure A and places the copies on the inputs of the four select actors. Each select actor retrieves the value (either an elementary value or a structure value) at the end of the path specified as its argument. The resulting value is associated with a token placed on the output arc of the actor.

A construct actor of the program is enabled when it has a token on each input arc and, upon firing, creates a new structure of the values associated with the input tokens. In the program of FIG. 3, each input arc of a construct actor is marked with a symbol designating the selector to be associated with the input in the resulting structure.

Structure values in a data-flow program are not modified; rather, new structure values are created which are modifications of the original values, while the original values are preserved. The append and delete actors provide the means of creating these new structure values.

Figure 4:
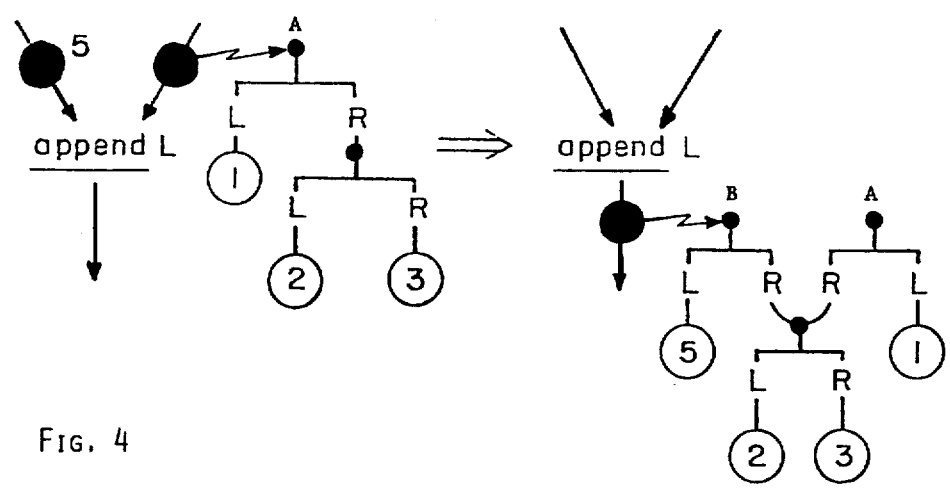
FIG. 4 is a diagram illustrating the operation of the append actor, in accordance with the present invention.

The structure produced by the firing of an append actor is a version of the input structure which contains a new or modified component (FIG. 4). If the specified node of the input structure has a selector corresponding to the selector argument of the actor, the value designated by that selector in the new structure is the input value. Otherwise the specified selector-value pair is added to the node of the new structure. Identical substructures of the input and output structures are shared between the two structures.

Figure 5:
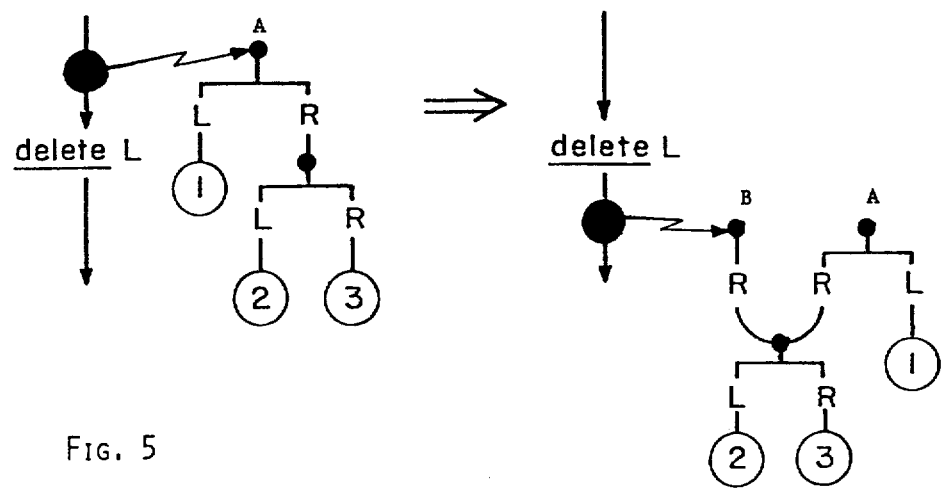
FIG. 5 is a diagram illustrating the operation of the delete actor, in accordance with the present invention.

In a similar manner, the structure appearing on the output arc of a delete actor is a version of the input structure in which the specified node in the new structure is missing the selector-value pair designated by the selector argument (FIG. 5). As with the append actor, identical substructures are shared between the input and output structures.

Structure Representation

The storage of structures and the execution of instructions representing structure actors occurs in the structure processing section of the processor. The structure processing section consists of a Structure Operation Unit, a Status Unit, an Identity Unit, and a Structure Memory with attendant Arbitration and Distribution Networks. This section of the processor is viewed as a functional unit by the instruction processing section; that is, instructions specifying structure operations are sent to the section, and data packets containing any resulting values are returned to the instruction processing section. The organization of the structure processing section is shown in FIG. 1.

All communication between the units comprising the structure processing section and between the structure processing section and the instruction processing section is through the transmission of fixed size information packets. An instruction specifying a structure operation along with all necessary operands is transmitted from the instruction processing section to the structure processing section as an operation packet. Similarly, result values sent to the instruction processing section are transmitted in data packets, each consisting of the identifier of some destination in the instruction processing section and a data item. Three more packet types, instruction packets, command packets, and unid packets, are utilized in inter-section and intra-section communication, and their use will be described later.

The Arbitration and Distribution Networks convey packets between the units comprising the structure processing section of FIG. 1. Each network is structured to allow the concurrent passage of many information packets. The structure of such networks is described in related applications Ser. No. 456,488, now U.S. Pat. No. 3,962,706, and Serial No. 605,932.

Operation packets are received from the instruction processing section by the Structure Operation Unit. The Structure Operation Unit controls the execution of the instruction specified in each operation packet through instruction packets sent to the Structure Memory. The Structure Memory holds all structure values of the data-flow program, and all structure operations are performed in the Structure Memory. Upon completion of a structure operation, a data packet containing the resulting elementary value or structure identifier is sent to the instruction processing section.

A node of a structure is contained in a Cell known as a Structure Cell. Each Structure Cell is designated by a unique Cell identifier which also served as the identifier of the structure node represented in the cell. A Structure Cell is composed of a number of registers equal to the number of arcs which can emanate from a node of a structure in the processor, in the present case two. The first field of a register is a use code which indicates whether the item stored in the third field is the identifier of another Cell or an elementary value or if the register is empty. The second field contains the selector associated with the element contained in the third field. A memory representation of the structure of FIG. 2 is presented in FIG. 6.

The Structure Memory is composed of a number of Structure Cells. Each Structure Cell is capable of holding one node of a structure, and the identifier of the Cell specifies a path through the Distribution Network to the Cell. The Structure Memory receives instruction packets from the Structure Operation Unit commanding a specific Structure Cell to execute some structure operation upon the node represented in the Cell. Upon completion of the operation specified in an instruction packet, a Structure Cell presents the result, if any, as a data packet to the first Arbitration Network for conveyance to the instruction processing section. Also, any further structure operations required to complete execution of the instruction are specified in instruction packets returned through the third Arbitration Network and the Identity Unit to the input of the Structure Memory.

A Structure Cell within the Structure Memory performs one of three operations on the structure node represented in the Cell. The possible operations are:

1. select. Upon receipt of an instruction packet specifying a select operation

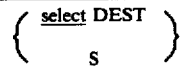

a Structure Cell follows one of two procedures, controlled by whether the selector S is a simple selector or a compound selector.

a. if S is a simple selector, the content C of the Cell register designated by S is used to form a data packet

which is presented to the first Arbitration Network for transmission to the instruction processing section of the processor. The designator DEST specifies the unit within the instruction processing section which is to receive the result C.

b. If S is a compound selector S1.S2. ... .Sn, where Si is a valid selector, the content B of the register designated by S1 is the identifier of another Structure Cell and is used to form the instruction packet

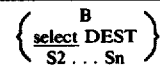

which is presented to the third Arbitration Network for transmission through the Identity Unit to the input Distribution Network of the Structure Memory. The process is then repeated with the selector S2 at Structure Cell B.

2. alter. The receipt of an alter instruction

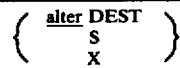

indicates that the contents of the Structure Cell are to be modified so the component designated by the simple selector S is set to X. Since existing structure values are not modified, a Structure Cell must be empty if it is the target for an alter instruction packet, and must receive two alter instructions, one for each register, before it can store a new node. Only after two alter instruction packets have been received is a data packet containing the Cell identifier B returned to the instruction processing section:

3. copy. A copy instruction

specifies that the content of the register designated by S is to be transmitted to Structure Cell B. An instruction packet

is formed of the register content C and is presented to the third Arbitration Network for transmission through the Identity Unit to the Distribution Network.

Instructions are transmitted to the Structure Memory as instruction packets, each consisting of a Cell identifier and an instruction. The Cell identifier specifies a path through the Distribution Network to the Cell, and the packet received by a Cell consists of merely the instruction portion of the instruction packet.

The Status Unit maintains a reference count for each node in the Structure Memory, specifying the number of arcs terminating on the node and the number of references to the node existing in the instruction processing section of the processor. When the reference count of a node becomes zero due to the execution of some instruction of a data-flow program, the node has become inaccessible, its reference count is set to one, and it is placed on a free node list which is used for the allocation of new nodes during program execution.

The Status Unit modifies the reference count associated with a Structure Cell in response to command packets received from the Structure Memory through the second Arbitration Network, from the instruction processing section, and from the Structure Operation Unit. Two of the three command packet types perform this function. The two types have the formats

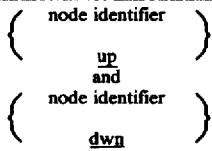

and cause the reference count of the designated node to be incremented or decremented, respectively. A third command packet type

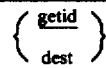

is transmitted to the Status Unit from the Structure Operation Unit to request a node identifier from the free node list. The cell identifier of a node is removed from the free node list and is sent to the specified destination in the Structure Operation Unit as a unid packet with the following format:

The processing of all structure operation packets by the Structure Operation Unit permits the unit to properly decrement reference counts through the transmission of dwn command packets to the Status Unit as references to items are deleted through instruction execution. References to items are created in the Structure Memory by execution of a select instruction if the selected item is a structure value and in the instruction processing section through execution of a distribute instruction representing a link of a dataflow program. In either case, an up command packet is sent to the Status Unit, causing the reference count of the node to be incremented.

The execution of each of the structure actors presented previously is described herein by listing the procedure followed by the Structure Operation Unit in processing each type of instruction. For the purpose of this disclosure, it is assumed that all selectors are simple selectors.

The processing of a select instruction by the Structure Operation Unit merely causes the reference count of the designated node to be decremented through transmission of a dwn command packet to the Status Unit. The content of the operation packet is then sent as an instruction packet to the specified Cell of the Structure Memory for execution of the select operation A construct instruction

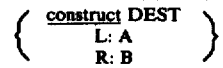

specifies that a new node is to be created with components A and B, designated by the selectors L and R. The instruction is implemented by the Structure Operation Unit as two alter operations in the following manner:

1. Request the identifier of a free Cell from the Status Unit.

2. Upon receipt of the identifier, C, transmit to the Structure Memory the instruction packets

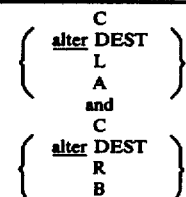

transferring the values A and B to the correct registers of C.

An operation packet containing an append instruction is of the following format

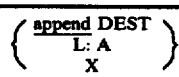

where a copy of the node in Structure Cell A is to be made in which the element selected by L is replaced by X. The procedure followed by the Structure Operation Unit in execution of the instruction is as follows:

1. Request the identifier of a free Cell from the Status Unit.

2. Upon receipt of the identifier, C, transmit the instruction packets

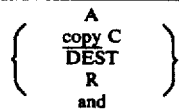

to the Structure Memory to copy the register of node A designated by the selector R into Cell C, and to set the L-component of C to X.

An operation packet specifying a delete instruction is processed in a similar manner, causing the use code of the designated register to be set to empty.

The Structure Operation Unit may be structured to concurrently process many operation packets as shown in FIG. 7. A Distribution Network 20 distributes the incoming operation packets among the Structure Operation Units 22. Instruction packets from the Structure Operation Units 22 are collected and transmitted to the input Distribution Network of the Structure Memory by Arbitration Network 24. Similarly, command packets are transmitted from the Structure Operation Units 22 to the Status Unit through Arbitration Network 26. Unid packets are returned to the Structure Operation Units 22 from the Status Unit through Distribution Network 28 within which the destination specifications of each unid packet is used to direct the associated node identifier to the Structure Operation Unit which requested it.

Figure 8:
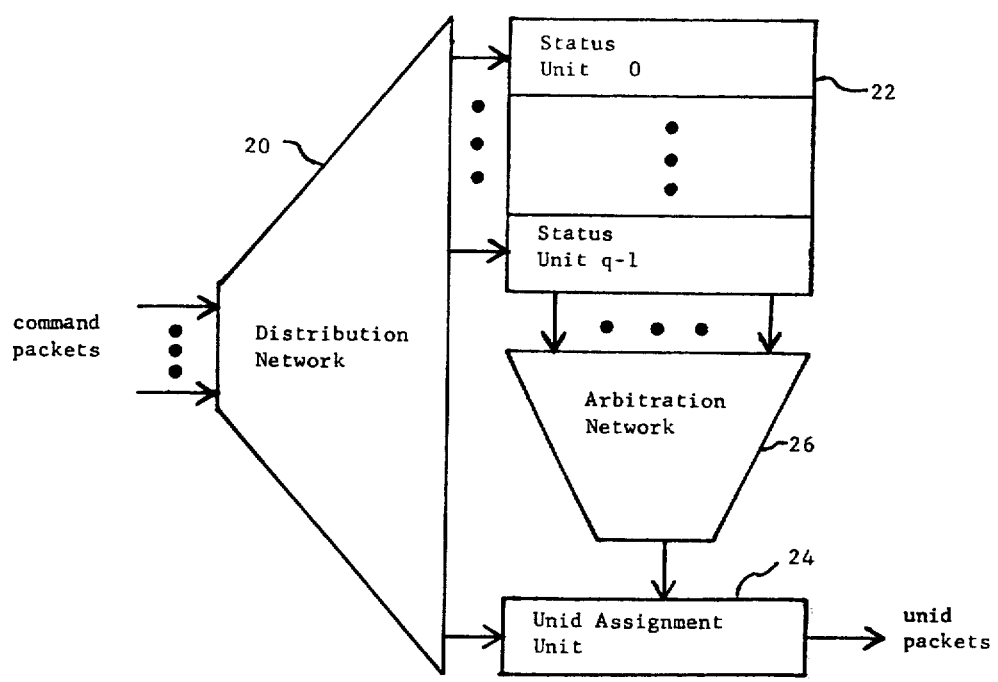
FIG. 8 is a general schematic of a status unit, a component of the system of FIG. 1.

Similarly, the Status Unit can be constructed to process many reference count transactions in parallel. Such a structure is shown in FIG. 8. Command packets received at the input of Distribution Network 20 are transmitted either to the appropriate Status Unit 22 in the case of up and dwn command packets, and to the unid assignment unit 24 in the case of getid packets. The identifiers of Cells whose reference counts have gone to zero upon execution of a dwn command are transmitted from each Status Unit 22 to the Unid Assignment Unit 24 through Arbitration Network 26.

The Structure Cells can act as a cache for active structure nodes in the same manner Instruction Cells act as a cache for active instructions presented in application Ser. No. 605,932. In such a case, individual nodes are retrieved from an auxiliary memory as they become required for computation, and structure nodes are sent to the auxiliary memory upon creation by execution of append, delete, or construct instructions. Structural details of structure memory 20 shown in FIG. 1 are related to details of the memory shown in FIGS. 3, 4, 31a, 32, and 33 and described at column 4, lines 12 through 47 and at column 12, line 24 to column 14, line 29 of U.S. Pat. No. 3,962,706. The structure memory 20 is composed of a plurality of independent structure cells, each structure cell consisting of two registers, just as the memory of U.S. Pat. No. 3,962,706 is composed of a plurality of independent Instruction Cells. Each register of a structure cell is composed of two fields, the first field holding the use code and consisting of two data switch modules, described in FIG. 9 of U.S. Pat. No. 3,962,706, and the second field holding either an elementary value or a cell identifier and consisting of a bit pipeline module, as described in FIG. 21 of U.S. Pat. No. 3,962,706. A counter module, described in FIG. 20 of U.S. Pat. No. 3,962,706, in conjunction with a value switch module, shown in FIG. 41 of U.S. Pat. No. 3,962,706, directs each field of a received value into the components holding that field as the value first arrives at the register. Each structure cell contains an address switch, as shown in FIG. 40 of U.S. Pat. No. 3,962,706, which decodes the register specification in the selector contained in each received instruction packet and transmits the instruction packet to the designated register, where it is processed. Since the cell input circuitry is shared between the two registers, the outputs of the registers can be ORed without fear of conflict, only one register unit can be active at any time.

The three operations performed by a register are implemented in a straightforward fashion and in the manner suggested by their description. Two address switches, described in FIG. 40 of U.S. Pat. No. 3,962,706, decode the operation specification in an incoming instruction packet and channel the packet to one of three units in the register. The select unit receives packets containing select instructions and utilizes a further address switch to examine the use code of the operand in a received packet for the purposes of switching the packet to one of two sub-units. The first sub-unit handles packets containing simple selectors and is composed of a counter, shown in FIG. 20 of U.S. Pat. No. 3,962,706, and merely transmits the DEST specification in the received instruction packet and the contents of the register as a data packet to the first arbitration network, using the counter module to transmit the bits of the DEST specification and the register contents held in the bit pipeline and data switches in turn. The second sub-unit of the select module handles packets containing compound selectors and utilizes a further counter module to transmit a different format instruction packet to the third arbitration network. The counter causes first the register contents held in the bit pipeline module to be transmitted, followed by the instruction specification of the received instruction packet and then the value of the compound selector received, less the bits specifying the register in the present structure cell. The alter unit receives instruction packets specifying alter instructions and utilizes a counter module to direct the received data item into the data switch and bit pipeline modules of the register as a new content for the register. Upon execution of an alter instruction by the first register of a cell, the first register transmits a signal indicating completion to the alter unit of the second register of the cell. This signal is ANDed at a C-Module, described in FIGS. 8a, 8b, and 8c of U.S. Pat. No. 3,962,706, with a signal indicating execution of an alter operation by the second register. When the output of the C-Module indicates that the two alter instructions have been processed, a counter module in the alter unit associated with the second register transmits the DEST specification and the unique identifier of the cell as a data packet to the first arbitration network. The copy unit receives instruction packets specifying copy operations and is composed of a counter module which transmits the specified information from the register and from the received information packet to the third arbitration network as an instruction packet.

Structural details of structure operation unit 22, identity unit 24, and status unit 26 are shown in FIGS. 1, 7, and 8, and certain details thereof are similar to details of the Functional Units shown in FIGS. 6 and 34 and described at column 5, lines 1 through 12 and at column 14, lines 30 through 45 of U.S. Pat. No. 3,962,706. The difference between the structure operation unit 22, identity unit 23, and status unit 26 lies in the function of the Operation Unit shown in FIG. 34 of U.S. Pat. No. 3,962,706. In the case of the structure operation unit 22, operation of the Operation Unit is specified by the procedures listed above which are implemented through a number of counter modules, shown in FIG. 20 of U.S. Pat. No. 3,962,706, which properly sequence the actions of the structure operation unit in response to the four possible packet types. The Operation Unit of the structure operation unit communications with the status unit 26 for the purpose of transmitting dwn and up command packets to the status unit 26 as required for the processing of operation packets received by the structure operation units 22 and for the purpose of requesting free unids necessary for the processing of operation packets and receiving same from the status unit 26 in unid packets. The Operation Unit of the structure operation unit 22 utilizes an address switch unit, as described in FIG. 40 of U.S. Pat. No. 3,962,706, for decoding the operation code of each received operation packet and transmitting the received packet to a sub-unit which handles the operation specified in the packet. A select sub-unit receives operation packets which specify select operations and is composed of a counter which generates a dwn command packet transmitted to the status unit 26 and then transmits an instruction packet to the output of the Operation Unit. A construct sub-unit receives command packets specifying construct operations and is composed of a further counter which causes the sequence described above for the operation of the construct unit to be followed: A command packet requesting a unid is transmitted to the status unit 26, and, upon receipt of a unique identifier from the status unit, the next states of the counter transmit the specified instruction packets to the output of the Operation Unit. As a packet enters the Operation Unit, a counter enters each part of the packet into a separate bit pipeline module, allowing the counter controlling the output to readily assemble the components of the output packet in the proper order. Append and delete sub-units receive operation packets specifying append and delete operations, respectively, and are also composed of counters which first request a unid from the status unit 26 and, upon its receipt, transmit the specified instruction packets to the output, also utilizing a number of bit pipeline modules to hold the various fields of the received command packet for assembly into the output instruction packet. Structural details of the structure operation unit shown in FIG. 7 are similar to those described above with the exception that the structure operation unit is composed of a plurality of Structure Operation Units and command and unid packets are distributed to the Structure Operation Units by two distribution networks, described in U.S. Pat. No. 3,962,706, and command and instruction packets are accepted from the Structure Operation Units and formed into streams of command and instruction packets by two arbitration networks, described in U.S. Pat. No. 3,962,706.

The Operation Unit of status unit 27 shown in FIG. 8 consists of a number of Status Units, each composed of a bit pipeline module, shown in FIG. 21 of U.S. Pat. No. 3,962,706, and a counter module, shown in FIG. 20 of U.S. Pat. No. 3,962,706, and each Status Unit is associated with a structure cell of the structure memory 20. A distribution network, substantially the same as described in FIGS. 39, 40, 41, and 41 of U.S. Pat. No. 3,962,706, directs a received command packet specifying an up or dwn command to the appropriate counter module which is then incremented or decremented, as specified by the command packet content. A counter, upon reaching a value of zero, transmits the cell identifier contained in its associated bit pipeline module into an arbitration network, structurally the same as that described in FIGS. 35, 36, 37, and 38 of U.S. Pat. No. 3,962,706. Upon receipt of a getid command packet, the distribution network of the status unit transfers the command packet to the unid assignment unit which consists of a counter and which accepts a unique identifier from the output of the arbitration network and transmits the destination identifier specified in the operation packet and the accepted unique identifier as a unid packet at the output port.

The Operation Unit of the identity unit 24 is merely a number of wires which transfer a packet received at the input to the output.

Structural details of distribution network 28 are substantially the same as details of the distribution network shown in FIGS. 39, 40, 41, and 42 and described at column 16, line 13 to column 17, line 7 of U.S. Pat. No. 3,962,706.

Structural details of first arbitration network 30, second arbitration network 32, and third arbitration network 34 are substantially the same as details of the arbitration network shown in FIGS. 35, 36, 37, and 38 and described at column 14, line 46 to column 16, line 12 of U.S. Pat. No. 3,962,706. The three arbitration networks are separate and distinct arbitration networks, each connected to one output port of each structure cell of the structure memory 20.

Since certain changes may be made in the foregoing specification, and the accompanying drawings without departing from the scope of the present invention, it is intended that all of the present disclosure, be interpreted in a illustrative and not in a limited sense.

What is claimed is:

1. A digital data processor comprising:
   (a) structure memory means for holding at least a record of structure nodes, said structure memory means containing a plurality of structure cells, each of said structure cells either holding one structure node of said record of structure nodes or being empty, and each structure cell having a unique index;
   (b) structure operation means for managing signals in the execution of data structure operations, said data structure operations comprising read and write operations on the structure nodes comprising said record of structure nodes held in said structure memory means;
   (c) status means for managing signals in maintaining a reference count associated with each structure node of said record of structure nodes held in said structure memory means, said reference count designating the number of references to its associated structure node existing in said digital data processor;
   (d) identity means for managing signals in the execution of identity operations;
   (e) instruction processing means for managing signals in the execution of instructions of a program and transmitting signals representing first information packets to said structure operation means and signals representing second information packets to said status means, said signals representing first information packets comprising signals representing read and write operations to be executed on said structure nodes of said record of structure nodes contained in said structure memory means and said signals representing second information packets consisting of signals representing operations necessary for maintenance of said reference count associated with each structure node of said record of structure nodes maintained in said structure memory means;

(f) distribution means operatively connected between said structure operation means and said structure memory means for concurrently transmitting signals representing a plurality of third information packets from said structure operation means and said identity means to said structure memory means, each of said signals representing third information packets consisting of signals representing an operation to be performed on a structure node of said record of structure nodes, together with all required operands;

(g) first arbitration means operatively connected between said structure memory means and said instruction processing means for concurrently transmitting signals representing a plurality of fourth information packets from said structure memory means to said instruction processing means, said signals representing fourth information packets consisting of signals representing data values resulting from execution of operations specified in said signals representing third information packets received by said structure memory means;

(h) second arbitration means operatively connected between said structure memory means and said status means for concurrently transmitting signals representing a plurality of fifth information packets from said structure memory means to said status means, said signals representing fifth information packets consisting of signals representing operations necessary for maintenance of said reference count associated with each structure node of said record of structure nodes maintained in said structure memory means; and (i) third arbitration means operatively connected between said structure memory means and said identity means for concurrently transmitting signals representing a plurality of sixth information packets from said structure memory means to said identity means, said signals representing sixth information packets consisting of signals representing operations to be performed on said structure nodes of said record of structure nodes contained in said structure memory means, together with all required operands.

2. The digital data processor of claim 1 wherein said structure memory means includes a plurality of structure cells, each of said structure cells having registers, each of said registers consisting of means for holding information records.

3. The digital data processor of claim 2 wherein each of said information records includes data items and descriptors.

4. The digital data processor of claim 3 wherein each of said data items consists of means for holding either data values or unique structure cell address indices.

5. The digital data processor of claim 3 wherein each of said descriptors includes selector means and register status means.

6. The digital data processor of claim 5 wherein each of said selector means consists of means for distinguishing a data item contained in an information record from said data items contained in other of said information records of said structure cell.

7. The digital data processor of claim 5 wherein each of said register status means consists of means for designating whether said information records are empty or said information records are full and said data items contained in said information records are unique structure cell address indices or data values.

8. The digital data processor of claim 2 wherein said signals representing third information packets are received by said structure memory means from said distribution means, said signals representing third information packets containing unique structure cell address indices and instructions consisting of functional specifications, destination specifications, and all relevant operands; said signals representing fourth information packets directed from said structure memory means to said first arbitration means include destination specifications and data values; said signals representing fifth information packets directed from said structure memory means to said second arbitration means include unique structure cell address indices and commands; and said signals representing sixth information packets directed from said structure memory means to said third arbitration means include unique structure cell address indices and instructions, each instruction consisting of a functional specification, destination specifications, and all relevant operands.

9. The digital data processor of claim 1 wherein said structure operation means consists of means for interpreting said signals representing first information packets received from said instruction processing means and means for sending, in response to said signals representing first information packets received from said instruction processing means, signals representing seventh information packets to said status means and signals representing third information packets to said distribution means for conveyance to said structure memory means, said signals representing seventh information packets consisting of signals representing operations necessary for the maintenance of the reference count associated with each structure node of said record of structure nodes maintained in said structure memory means and signals requesting unique structure cell indices of structure cells which are empty.

10. The digital data processor of claim 9 wherein said signals representing first information packets are received by said structure operation means from said instruction processing means, said signals representing first information packets containing unique structure cell address indices and instructions, each instruction consisting of a functional specification, destination specifications, and all relevant operands; signals representing eighth information packets are received by said structure operation means from said status means, said signals representing eighth information packets containing unique structure cell address indices; said signals representing third information packets directed from said structure operation means to said distribution means include unique structure cell address indices and instructions, each instruction consisting of a functional specification, destination specifications, and all relevant operands; and said signals representing seventh information packets directed from said structure operation means to said status means include unique structure cell address indices and commands.

11. The digital data processor of claim 2 wherein said status means consists of means for maintaining reference count records for a plurality of said structure cells in said structure memory means and means for maintaining a list of the unique structure cell indices associated with empty structure cells in said structure memory means.

12. The digital data processor of claim 11 wherein each of said reference count records consists of means for designating the number of said registers comprising said structure cells in said structure memory which contain data records consisting of the unique index of said structure cell associated with said reference count record and the number of references existing in said instruction processing means to said structure cell associated with said reference count record.

13. The digital data processor of claim 12 wherein said reference count record holds an integer value which is incremented or decremented in response to said signals representing fifth information packets received from said second arbitration means, said signals representing second information packets received from said instruction processing means, and said signals representing seventh information packets received from said structure operation means, and said reference count record becoming zero causing the unique structure cell index associated with said reference count record to be placed on the list of unique structure cell indices associated with structure cells which are empty.

14. The digital data processor of claim 12 wherein said signals representing fifth information packets are received by said status means from said second arbitration means, said signals representing second information packets are received by said status means from said instruction processing means, and said signals representing seventh information packets are received by said status means from said structure operation means, said signals representing fifth, second, and seventh information packets consisting of signals representing unique structure cell address indices and up or dwn commands specifying the incrementing or decrementing of said reference count records and getid commands requesting unique structure identifiers, and said signals representing eighth information packets directed from said status means to said structure operation means include destination specifications and unique structure cell address indices, where said signals representing eighth information packets are transmitted in response to said signals representing seventh information packets specifying getid operations.

15. The digital data processor of claim 1 wherein said identity means transmits said signals representing fifth information packets received from said third arbitration means as signals representing third information packets to said distribution means.

16. The digital data processor of claim 15 wherein said signals representing fifth information packets are received by said identity means from said second arbitration means, said signals representing fifth information packets consisting of signals representing unique structure cell address indices and instructions, each instruction consisting of a functional specification, destination specifications, and all relevant operands, and said signals representing third information packets directed from said identity means to said distribution means consisting of signals representing unique structure cell address indices and instructions, each instruction consisting of a functional specification, destination specifications, and all relevant operands.

17. The digital data processor of claim 1 wherein a plurality of said signals representing third information packets are transmitted simultaneously by said distribution means and said signals representing third information packets consist of signals representing a unique structure cell address index and an instruction consisting of a function specification, destination specifications, and all relevant operands, said unique structure cell address index specifying a path through said distribution means to a destination structure cell in said structure memory means.

18. The digital data processor of claim 1 wherein a plurality of said signals representing fourth information packets are transmitted simultaneously by said first arbitration means and said signals representing fourth information packets consist of signals representing a destination specification and a data item, wherein said destination specification designates a destination for said information packet within said instruction processing means.

19. The digital data processor of claim 1 wherein a plurality of said signals representing fourth information packets are transmitted simultaneously by said second arbitration means and said signals representing fourth information packets consist of signals representing a unique structure cell address index and a command, said command designating an operation to be performed in said status means.

20. The digital data processor of claim 1 wherein a plurality of said signals representing fifth information packets are transmitted simultaneously by said third arbitration means and said signals representing fifth information packets consist of signals representing a unique structure cell address index and an instruction consisting of a function specification, destination specifications, and all relevant operands, said unique structure cell address index specifying a path through said distribution means to a destination structure cell in said structure memory means.

* * * * *

UNITED STATES PATENT AND TRADEMARK OFFICE
CERTIFICATE OF CORRECTION

PATENT NO. : 4,149,240
DATED : April 10, 1979
INVENTOR(S) : David P. Misunas and Jack B. Dennis It is certified that error appears in the above-identified patent and that said Letters Patent are hereby corrected as shown below:

On Pages 1 and 2 under the section entitled "RELATED APPLICATIONS", the last paragraph thereof should read as follows: --The work resulting in this invention was supported by Grant No. GJ 34671 awarded by the National Science Foundation.--

Signed and Sealed this

Third Day of July 1979

[SEAL]

Attest:

Attesting Officer

LUTRELLE F. PARKER
Acting Commissioner of Patents and Trademarks